US006820026B1

(12) United States Patent
Schoch

(10) Patent No.: US 6,820,026 B1
(45) Date of Patent: Nov. 16, 2004

(54) CONSOLE MOUNTED VIBRATION SEVERITY MONITOR

(75) Inventor: Daniel A. Schoch, Minster, OH (US)

(73) Assignee: The Minster Machine Company, Minster, OH (US)

(*) Notice: Subject to any disclaimer, the term of this patent is extended or adjusted under 35 U.S.C. 154(b) by 0 days.

(21) Appl. No.: 09/487,688

(22) Filed: Jan. 19, 2000

Related U.S. Application Data

(63) Continuation-in-part of application No. 08/957,047, filed on Oct. 24, 1997, now Pat. No. 6,209,400.
(60) Provisional application No. 60/116,460, filed on Jan. 20, 1999.

(51) Int. Cl.[7] .................. G06F 11/00; G06F 19/00; G01M 7/00
(52) U.S. Cl. .................. 702/105; 702/34; 702/35; 702/56; 73/570; 700/206
(58) Field of Search .................. 702/33–36, 39, 702/41–44, 56, 98, 103, 105, 108, 113–115, 138, 140–142, 181–185, 188; 73/570, 597, 658, 660; 700/1, 206

(56) References Cited

U.S. PATENT DOCUMENTS

| | | | |
|---|---|---|---|
| 3,201,776 A | 8/1965 | Morrow et al. .............. 340/261 |
| 3,859,847 A * | 1/1975 | Ronemus ..................... 375/222 |
| 4,302,813 A * | 11/1981 | Kurihara et al. ............ 364/508 |
| 4,302,977 A | 12/1981 | Sisson et al. |
| 4,520,674 A | 6/1985 | Canada et al. ............... 73/660 |
| 4,612,620 A | 9/1986 | Davis et al. ................. 364/551 |
| 4,683,542 A | 7/1987 | Taniguti ..................... 364/508 |
| 4,885,707 A | 12/1989 | Nichol et al. ........... 364/551.01 |
| 4,987,528 A * | 1/1991 | O'Brien ....................... 364/184 |
| 5,094,107 A * | 3/1992 | Schoch ........................ 73/570 |
| 5,109,700 A | 5/1992 | Hicho ......................... 73/660 |
| 5,251,151 A | 10/1993 | Demjanenko et al. ...... 364/550 |
| 5,602,757 A * | 2/1997 | Haseley et al. ......... 364/551.01 |
| 5,633,811 A * | 5/1997 | Canada et al. .............. 702/190 |
| 5,724,843 A * | 3/1998 | Kirii et al. ..................... 73/660 |
| 5,802,151 A * | 9/1998 | Bevill et al. .............. 379/93.05 |
| 5,808,903 A | 9/1998 | Schiltz et al. ............... 364/508 |
| 5,870,699 A * | 2/1999 | Canada et al. .............. 702/190 |
| 5,906,020 A * | 5/1999 | Swint ............................ 8/159 |
| 6,209,400 B1 * | 4/2001 | Schoch et al. ................ 73/778 |
| 6,241,435 B1 * | 6/2001 | Huang et al. ................ 409/141 |

* cited by examiner

*Primary Examiner*—Marc S. Hoff
*Assistant Examiner*—Paul Kim
(74) *Attorney, Agent, or Firm*—Randall J. Knuth

(57) ABSTRACT

The invention is directed to a monitoring system device attachable to a mechanical press, to measure long term reliability press conditions while in production operation. The device includes signal processing circuitry for processing a corresponding signal developed from an accelerometer. The signal processing circuitry has acceleration processing circuitry for calculating a press acceleration signal, a velocity processing circuitry for calculating a press velocity signal, and displacement processing circuitry for calculating a press displacement signal. Display circuitry is used for displaying at least one of said calculated signals.

43 Claims, 1 Drawing Sheet ated to press speed are inherent in any press design and
CONSOLE MOUNTED VIBRATION SEVERITY MONITOR This application claims benefit under 35 U.S.C §120 as a continuation-in-part of U.S. patent application Ser. No. 08/957,047 filed Oct. 24, 1997 and which issued as U.S. Pat. No. 6,209,400 on Apr. 3, 2001, which claims the benefit of Provisional application No. 60/116,460 filed Jan. 20, 1999.

BACKGROUND OF THE INVENTION

1. Field of the Invention

The present invention relates generally to press vibration monitoring and more particularly, to a method of generating a press load/speed vibration severity condition indicator for the determination of press/die long-term operating reliability during production operation and to an apparatus utilizing the information generated by the above method in monitoring press vibration severity.

2. Description of the Related Art

The traditional method for calculating the tonnage of a press die is mainly by a means of static load calculation. A given die has a certain material shear length and a stock material with a certain thickness. From this, the tonnage of the die or the force necessary to shear or form the part may be calculated. Traditional press sizing has been based on "static" die shear loading as calculated using the equation; [Shear Length (in.)] [Thickness (in.)] [S. (lb/in2)]=Shear Load (lb).

This load (plus forming and blanking static loads) has traditionally been considered the only significant load and thus the peak dynamic load of the press. Generally, on shorter stroke machines at speeds below 300 strokes per minute, dynamic effects are not a major influence on die application severity. As press speeds are increased however, there are several other dynamic influences which become present, thereby creating additional press loadings in addition to increases produced by the actual shear loading above the traditional static calculated value. In many cases, these dynamic loads surpass the shear load as the peak dynamic load. In addition to greater effective shear loads, additional impact forces are created as press speed increases, which further contributes to the vibration of the press structure.

It has been found through experimentation, that as the press speed increases there are impact magnifications to static loads as well as several additional loads that occur that are not present at slower press speeds. There are actually several different sources of additional die load parameters that many press operators, production managers, or owners do not necessarily know exist. At higher speeds, even though not exceeding the capacity of the press, the press requires more force to make the part, which in turn creates a different set of more severe vibration conditions.

At higher press speeds, in the press structure, the loads are applied much more quickly, are released more quickly, and in general are producing a much stronger shock wave which is dispersed and dissipated through the press structure. By increasing the speed of the press, the slide velocity at any given point above the bottom dead center position is increased, thereby increasing the impact forces of the punches on the stock material. These impact force increases are related to the square of the velocity. Therefore, press speed is one of several factors increasing vibration in the press. By running the press at higher speeds, more severe vibration is transmitted through the press.

Thus, the above described dynamic effects that occur during press operation increase the loading and overall vibration levels induced in the press structure, all of which increase with an increase in press speed.

Vibration stress magnifications, created by dynamic load increase, can cause many problems to press structures. Cracks can develop over time anywhere within the press structure or its parts if long term dynamic load increases are unknown or go ignored. Broken structural and component parts such as tie rods, crankshafts, crowns, slides and dynamic balancers have been reported, and in all instances the vibration severity has been able to be correlated by field service failure data to develop specific threshold vibration severity levels measured on the press structure during production. At certain definable vibration severity levels, stress magnification levels will be present thus creating increased maintenance severity problems for the press.

The relative life of a press is thus determinable from the accumulative effects of the vibration severity levels experienced over this period of time. A press may withstand high vibration levels without major structural damage if the duration period is relatively short. Also, a press will certainly withstand low vibration levels without structural damage no matter what the duration period.

Accumulative structural damage will occur, however, when a press is run in a magnified stressed condition as a result of medium to high vibration severity levels over a longer duration period whether run continuously or intermittently. The damage will not necessarily be evident in the early stages but will begin to appear over time.

Vibration monitoring systems of the prior art require that a no load response level be determined with periodic no load checking of the relative level at several specific component locations, to try to evaluate the progress of component deterioration.

What is needed in the art is an apparatus which measures the actual application vibration severity levels while in actual production, which allows the press operator, tooling engineer, production manager, or owner to know the long term reliability effects of running the press at any combination of sensed speed and load, by monitoring the actual vibration severity level of the die application via measurement of press RMS velocity by means of an accelerometer, displaying the vibration severity level, and taking action with such result.

SUMMARY OF THE INVENTION

Generally, the present invention provides a method and apparatus for the identification of dynamic press load/speed vibration severity condition and for the determination of press/die long-term operating reliability during production operation for presses of a given design.

More specifically, the process of the present invention measures the vibration severity levels of actual die applications, and electronically converts these measurements to identify the zones for press operating reliability generated by the use of an accelerometer sensor. The system reports vibration severity zones during press production operation. The zones thus established relate the press RMS velocity vibration severity level to the potential long-term operating reliability for the particular press as follows:

Zone 1 Extreme Long-Term Reliability;
Zone 2 Very Good Long-Term Reliability;
Zone 3 Reliable (With Caution); and
Zone 4 Not Advisable For Long-Term Reliability.

During actual press production operation, RMS velocity vibration is monitored, processed and displayed. A sensor, which is preferably an accelerometer, is placed on a location of the press. A calibrated electrical circuit converts the press acceleration signal to determine a press velocity signal, a press displacement signal or an RMS velocity measurement within a roll off frequency range of approximately 10 to 100 Hertz.

The present invention advises of the level of vibration severity and long term reliability of metal forming presses for any application, run at any speed with any material and any tooling set up condition. Previous preventive maintenance vibration monitoring only monitors no load changes to a base reference level of specific components, attained through no load reference level analysis. The previous prior art preventive maintenance vibration level measured under no load conditions do not accurately reflect actual production vibration conditions, as does the present vibration severity monitoring system.

Thus, for reliable long-term press production operation, a particular press must be operated within zones of safe load/speed dynamic combinations which will cause acceptable levels of press vibration severity. Each different press design will have certain inherent vibration dissipation characteristics which will allow it to be safely operated with long term reliability within a range of production speeds and dynamic load combinations.

Each singular press may be monitored using an integral console monitor, or a plurality of presses, alternatively, may be monitored using a single portable measurement unit. A press is monitored during production utilizing the following apparatus.

The invention comprises, in one form thereof, a device for monitoring the severity of operation of applications running in a mechanical press comprising at least one signal generator, a signal conditioner operatively connected to the signal generator for calculating a value from the generated signal, and a display operatively connected to said signal conditioner.

The invention comprises, in another form thereof, a device attachable to a mechanical press to measure the overall severity press conditions comprising an accelerometer for measuring press conditions and creating a corresponding signal and a signal processing means for processing the corresponding signal. The signal processing means is connected to the accelerometer to process the corresponding signal including the following possible branch circuits: an acceleration processing means for calculating a press acceleration signal; a velocity processing means for calculating a press velocity signal; and a displacement processing means for calculating a press displacement signal.

A display means is utilized for displaying at least one of the calculated signals with a switch connecting the acceleration, velocity, and displacement processing means together to thereby permit an operator to select one of the calculated signals for input to the display means.

The display means comprises a means for measuring the voltage of the calculated signals and digitally displaying the voltage as representing a press condition. Additionally, the display means may include a plurality of LED's arranged to illuminate at separate predefined applied voltage ranges whereby an illuminated LED represents a particular range for a signal input to the display means. The range corresponds to a particular vibration severity zone or range. The LED's illuminate in different colors depending on the predefined applied voltage range.

The invention comprises, in yet another form thereof, a method of monitoring the long-term reliability of a mechanical press comprising the steps of generating a unique press vibration severity/reliability zone chart, monitoring the vibration severity of the press, and outputting the monitored vibration severity and the corresponding vibration severity/reliability zone.

An advantage of the present invention over the prior art is to allow the press owner to instantaneously predict and determine the long term reliability effects being created by any application during its dynamic operation, under various material, speed, setup, or other operating conditions.

Another advantage of the present invention is that it contains signal processing circuitry to monitor positive and negative peak values and convert their signal levels utilizing a unique root means square (RMS) system converter to convert the signal into DC voltages. LED indicators are utilized for use by non technical personnel which are connected to particular voltage levels to indicate the different vibration severity zones as referenced above. The system can measure actual reliability conditions with any set of die setup variables as they are happening in production.

The present invention overcomes many prior art shortcomings by establishing almost instantly the vibration severity condition of the mechanical press and die application combination created by its current operating set up. This data is then used to guide the user in better understanding the risks being created, and thus operating the press more safely and under production conditions which promotes improved press and die longevity. This data can also be used to guide the user to selection of proper new presses for planned future production applications.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
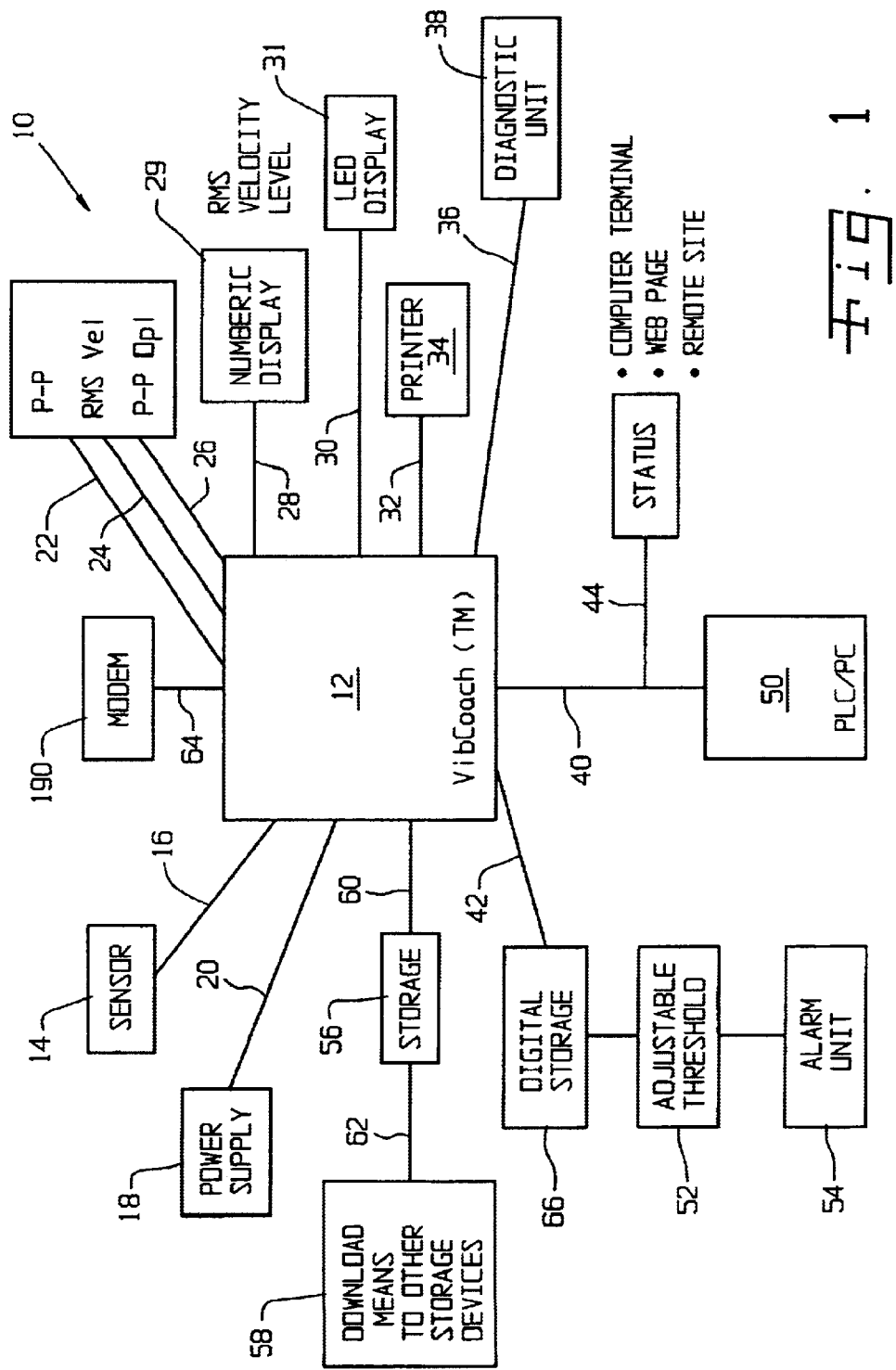
FIG. 1 schematically depicts one embodiment of the present invention.

The exemplification set out herein illustrates one preferred embodiment of the invention, in one form, and such exemplification is not to be construed as limiting the scope of the invention in any manner.

DETAILED DESCRIPTION OF THE INVENTION

Referring now to FIG. 1, vibration severity monitoring system 10 of the present invention is shown.

In a general overall view, system 10 comprises a signal conditioning means for conditioning and displaying a signal from an accelerometer 14. The signal so obtained (i.e., a signal corresponding to and related to a press operating condition), is amplified and conditioned in three separate ways to obtain signals representing press displacement, press velocity, and press acceleration. One of these selected signals is conditioned by a peak to peak detector along with an RMS to DC voltage converter sub-circuit. This signal, now at a particular DC level, is then displayed by a volt meter and additionally displayed on a bank of LEDs designed to illuminate at particular voltage levels, thereby indicating a particular type of signal or signal level. These LEDs, when illuminated indicate which zone of vibration severity is currently being detected by accelerometer 14.

FIG. 1 discloses the preferred embodiment of the invention in which the vibration severity monitor is console mounted including a housing 12 attached to a press (not shown). A plurality of acceleration sensors 14 are connected by lines 16 to the VibCoach™ or (Vibration Severity Monitor) module or unit 12. Power supply 18 is connected by line 20 to unit 12. VSM or VibCoach™ module 12 has a plurality of different types of output for use of displaying and taking action based upon the particular inputs obtained from acceleration sensor 14.

Schematic showing of FIG. 1 shows that a number of analog signals as shown on lines 22–26 include a peak to peak acceleration output signal 22, an RMS velocity output signal 24, or a peak to peak displacement signal 26. Line 28 shows an output in terms of a numeric zone display 29 for disclosing or showing to an operator the RMS velocity level or other types of data calculated by unit 12. Along line 30 is a graphical display 31 showing the zones of the vibration severity measurement computed by the VSM unit 12 and displayed thereon, which provides a very user friendly, easy to understand situation advisory alert.

Such method of calculation is known and shown in U.S. Pat. No. 5,094,107 of which the disclosure is incorporated herein by reference.

Line 32 is an output from the VSM or VibCoach™ unit 12 connected to a printer 34 for having a physical output of the computed data and data zones or raw data even from VSM unit 12. Line 36, also an output from the VSM unit 12, is connected to a diagnostic unit 38 which is used to determine whether sensors 14 or VSM circuit 12 includes any type of faults.

Lines 40 and 42 may comprise digital data output lines. Line 40, as shown in FIG. 1, may be connected to a communication network 44. Such information, which may be relayed down data line 40 and through a remote communication network 44, may include the status from the VSM unit 12 along with any particular press it is connected to. Such digital outputs such as the vibration severity condition, acceleration, velocity, and displacement measured by acceleration sensor 14 may be communicated to a remote computer terminal, an Internet web page, or other remote site.

As further shown in FIG. 1, line 40's digital outputs are passed to a press machine controller such as that shown by reference 50. Such press machine controller 50, as known in the art, may comprise a programmable logic controller (PLC) or Computer (PC) to control press functions. Such output may include gathering, sorting, and filtering data obtained from VSM unit 12 via data line 40. PLC controller 50 may include particular options of graphic displays of monitoring and displaying vibration severity versus time, along with vibration severity statistics such as the percent of time within a particular vibration severity zone, total time of press operation in a zone, quantity of alarms, and the particular relationships of the alarm start time to various operation times. Further, the VSM/programmable logic controller 50 may include the ability to produce production statistics such as percent of up time, a percentage of quantity produced versus time fluctuation and quantity of stops.

Data line 42 connects the VSM unit 12 to a digital storage means 66 such as a hard drive or other electronic storage medium for storing particular vibration severity zone data and other data created and transmitted from VSM unit 12. An adjustable threshold 52 may be electronically created within a device to determine when the data from VSM unit 12 exceeds such adjustable thresholds, such as by a comparator or other comparing means. When such vibration severity level would pass such adjustable threshold preset value, an alarm alert 54 may be created and forwarded to a number of different advisory alert alarms, or other physical devices such as rotating or flashing lights on the press or other types of alarms.

Alarm unit 54 may include such alarm devices such as lights or communication to personal pagers maintained by maintenance personnel at the plant site. The alarm alert system may comprise printing such alert data to a remote computer terminal or a remote or local network or simply forwarding such data and alarm data to a remote location via wireless or land line communication networks, such as an internet router or client, such as a facsimile machine. Additionally, alarm alert system 54 may comprise a system in which prerecorded or computer generated voice or other signal tones may be created and sent via a telephone network to preselected phone numbers or to an answering service. Also, the alarm alert system 54 may create an alarm message and forward it via e-mail to a remote location or destination.

Data line 60 connects the VSM unit 12 to a digital storage means 56, which is, for example, a hard drive or other electronic storage medium for storing any data created and transmitted from VSM unit 12. Data line 62 connects digital storage device 56 to downloader 58 which allows data stored in digital storage device 56 to be downloaded to portable storage devices.

Additionally, connectivity of device 10 may include an add-on remote transmitting device such as modem 190 to send the computed vibration severity data to a central station or remote data storage center.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for monitoring and controlling the operation of a mechanical press, comprising:
   an at least one signal generator;
   a signal conditioner operatively connected to said at least one signal generator, for calculating a value from said at least one generated signal, said signal conditioner being configured for relating said calculated value to one of a plurality of severity operating zones;
   a display operatively connected to said signal conditioner; and
   a press control unit configured for selectably controlling said mechanical press in accordance with said calculated value in relation to a plurality of severity operating zones, each said severity operating zone defining a relative level of a potential long-term operating reliability of said mechanical press, said calculated value being received from said signal conditioner and/or said display.

2. The device of claim 1, wherein said at least one signal generator is an accelerometer.

3. The device of claim 2, wherein said accelerometer monitors press conditions and creates a corresponding signal.

4. The device of claim 1, wherein said at least one signal generator is attached to the press.

5. The device of claim 1, wherein said value from said signal conditioner is one selected from the group including: press displacement, press velocity, and press acceleration.

6. The device of claim 1, wherein said signal conditioner further conditions said calculated value by a peak to peak detector.

7. The device of claim 1, wherein said signal conditioner further conditions said calculated value with an RMS to DC voltage converter.

8. The device of claim 1, wherein said display includes a volt meter for displaying said calculated value.

9. The device of claim 1, wherein said display includes an at least one LED for indicating a vibration severity zone, said vibration severity zone indicating a range for said calculated value.

10. The device of claim 9, wherein said vibration severity zone is characterized by one selected from the group including: extreme long-term reliability of the press; very good long-term reliability of the press; reliable conditions under caution; and conditions that are not advisable for long-term reliability.

11. The device of claim 1, further comprising a switch.

12. The device of claim 11, wherein said switch allows user selection of said calculated value for said display.

13. The device of claim 1, wherein said press control unit further comprising a press machine controller for controlling press functions in response to said calculated values from said signal conditioner.

14. The device of claim 13, wherein said press machine controller includes a programmable logic controller.

15. The device of claim 13, wherein said press machine controller calculates at least one selected from the group comprising: vibration severity versus time, percent of time within a particular vibration severity zone, total time of press operation in a zone, quantity of alarms, time of alarms with respect to operation times, percent of operation time versus non-operation time, and percentage of quantity produced versus time fluctuation and quantity of stops.

16. The device of claim 1, further comprising an alarm signal generator for signaling undesirable operating conditions.

17. The device of claim 1, further comprising a data storage device for selectively storing digitized output.

18. The device of claim 1, further comprising a modem or transmitting said calculated values to a remote location.

19. A device attachable to a mechanical press for measuring press conditions and controlling said mechanical press based on said press conditions, said device comprising:
   an at least one accelerometer for measuring press conditions and creating a corresponding signal;
   a signal processing means for processing said corresponding signal, said signal processing means connected to said at least one accelerometer to process said corresponding signal, said signal processing means comprising:
   an acceleration processing means for calculating a press acceleration value;
   a velocity processing means for calculating a press velocity value;
   a displacement processing means for calculating a press displacement value;
   a display means for displaying at least one of said calculated values;
   a switch permitting an operator to select one of said calculated values for input to said display means; and
   a press control unit configured for selectably controlling said mechanical press in accordance with at least one said calculated value from said signal processing means and/or said display means, said press control unit being configured for relating each said at least one said calculated value to one of a plurality of severity operating zones as a basis of control of said mechanical press, each said severity operating zone defining a relative level of a potential long-term operating reliability for said mechanical press.

20. The device of claim 19, wherein said display means further displays a vibration severity zone characteristic.

21. The device of claim 20, wherein said vibration severity zone characteristic is an LED indicator representing the operating conditions of the press.

22. The device of claim 20, wherein said vibration severity zone characteristic is one selected from the group including: extreme long-term reliability of the press, very good long-term reliability of the press, reliable conditions provided there is cautious operation, and conditions that are not advisable for long-term reliability.

23. The device of claim 19, wherein said accelerometer measures press conditions during operation of the press.

24. The device of claim 19, wherein said press control unit further comprising a press machine controller for controlling press functions in response to said calculated values.

25. The device of claim 19, further comprising an alarm signal generator for signaling undesirable press operating conditions.

26. The device of claim 25, wherein said alarm signal generator generates a signal in at least one method selected from the group including: lighting a light at the press machine, paging a selected individual, forwarding the signal to a remote location, forwarding a prerecorded message to a preselected phone number, and forwarding an electronic message to a remote location.

27. The device of claim 19, further comprising a data storage device for selectively storing at least one of said calculated values and measured conditions.

28. The device of claim 19, further comprising a modem for transmitting said calculated values to a remote location.

29. A method of monitoring the long-term reliability of a mechanical press and controlling said mechanical press based on the long-term reliability thereof, comprising:
   generating a unique press vibration severity/reliability zone chart including a plurality of severity operating zones, each said severity operating zone defining a relative level of a potential long-term operating reliability for said mechanical press;
   monitoring the vibration severity of said mechanical press;
   outputting the monitored vibration severity and the corresponding severity operating zone; and
   selectably controlling said mechanical press in accordance with the monitored vibration severity and the corresponding severity operating zone therefor.

30. A system in combination with a press machine and a press machine sensor assembly, said system comprising:
   a press machine vibration monitoring apparatus, said press vibration monitoring apparatus being operatively coupled to said press machine sensor assembly, said press machine vibration monitoring apparatus comprising:
   a processor to process sensor signals generated by said press machine sensor assembly, said processor outputting a calculated value; and
   a press machine controller being operatively coupled to said processor, said press machine controller being configured for selectably controlling said press machine, said press machine controller being configured for relating said calculated value to a plurality of severity operating zones as a basis of control of said mechanical press, each said severity operating zone defining a relative level of a potential long-term operating reliability of said mechanical press.

31. The system as recited in claim 30, wherein said press machine controller being configured further to control said press machine in accordance with processed sensor signals received from said processor.

32. The system as recited in claim 30, wherein said processor being configured to generate relative to said press machine at least one of an acceleration measurement, a velocity measurement, and a displacement measurement.

33. The system as recited in claim 30, wherein said press machine sensor assembly includes at least one accelerometer.

34. The system as recited in claim 30, further includes a display operatively coupled to said processor.

35. The system as recited in claim 30, wherein said press machine vibration monitoring apparatus defining a built-in element of said press machine.

36. An apparatus in combination with a press machine and a press machine sensor assembly, said apparatus comprising:

a press machine vibration measurement device operatively coupled to said press machine sensor assembly, said press machine vibration measurement device being configured for generating a measurement value; and a press machine controller operatively coupled to said press machine vibration measurement device, said press machine controller being configured for relating said measurement value to one of a plurality of severity operating zones as a basis of control of said mechanical press, each said severity operating zone defining a relative level of a potential long-term operating reliability of said mechanical press.

37. The apparatus as recited in claim 36, wherein said press machine vibration measurement device further comprises a press acceleration determination unit, a press velocity determination unit, and/or a press displacement determination unit.

38. The apparatus as recited in claim 36, further comprises:

display operatively coupled to said press machine vibration measurement device and/or said press machine controller.

39. The apparatus as recited in claim 36, wherein apparatus having a built-in configuration relative to said press machine.

40. A method in combination with a press machine, said method comprising the steps of:

sensing and measuring vibration activity in said press machine; and selectably and operably controlling said press machine in accordance with the vibration activity measurement, the vibration activity measurement being related to one of a plurality of severity operating zones as a basis of control of said mechanical press, each said severity operating zone defining a relative level of a potential long-term operating reliability of said mechanical press.

41. The method as recited in claim 40, further comprises the step of:

providing a built-in press machine vibration monitoring device configured to perform the vibration activity measurement and/or the press machine operation control.

42. The method as recited in claim 40, further comprises the step of:

displaying the vibration activity measurement and/or a representation thereof.

43. The method as recited in claim 40, further comprises the step of:

performing at least one of an alarm notification task, a vibration-related data storage task, a diagnostic task, and/or a remote vibration-related data communication task, using the vibration activity measurement.

* * * * *